United States Patent [19]

Bonn et al.

[11] 4,281,411
[45] Jul. 28, 1981

[54] HIGH SPEED DIGITAL COMMUNICATION RECEIVER

[75] Inventors: Jerrold L. Bonn, Waltham; Paul F. Mahoney, Brighton; Peter Monsen, Stow, all of Mass.

[73] Assignee: Signatron, Inc., Lexington, Mass.

[21] Appl. No.: 51,722

[22] Filed: Jun. 25, 1979

[51] Int. Cl.³ .......................................... H04B 7/08
[52] U.S. Cl. ................................ 375/14; 375/100; 455/137
[58] Field of Search .................. 375/11, 12, 14, 100; 455/132, 137, 138, 139; 333/18; 364/724

[56] References Cited

U.S. PATENT DOCUMENTS

| | | | |
|---|---|---|---|
| 2,903,576 | 9/1959 | Altman | 455/138 |
| 3,659,229 | 4/1972 | Milton | 375/14 |
| 3,879,664 | 4/1975 | Monsen | 375/14 |
| 3,962,637 | 6/1976 | Motley et al. | 375/14 |
| 4,112,370 | 9/1978 | Monsen | 375/14 |

Primary Examiner—Benedict V. Safourek
Attorney, Agent, or Firm—Robert F. O'Connell

[57] ABSTRACT

An improved high speed digital communications diversity receiver using a forward adaptive transversal filter equalizer, having a plurality of weighting sections in each diversity channel to provide a combined weighting signal, wherein the required complex multiplications and correlations needed for weighting purposes are performed at IF frequencies, while the time-delayed combining operations for providing the desired combined weighted output signal are performed at baseband frequencies. Such an arrangement reduces the number of tapped delay lines normally needed for such transversal filter equalizer operation and further reduces the signal losses incurred in operating delay line devices at intermediate frequencies so that fewer large gain-bandwidth product amplifiers are required in the system than the number required in previously available systems using such forward transversal filter equalizers.

9 Claims, 4 Drawing Figures

HIGH SPEED DIGITAL COMMUNICATION RECEIVER

INTRODUCTION

This invention relates generally to communications systems and, more particularly, to communications system receivers for use in receiving signals which have been transmitted through a dispersive transmission medium, such as a fading multipath medium.

BACKGROUND OF THE INVENTION

In fading multipath transmission systems, such as those characterized by troposcatter communication links, for example, the transmitted signal is conveyed through the multipath medium along a plurality of decorrelated paths so that a plurality of signals, each representing the transmitted signal but having varying energy contents, are received. Fading effects in such communication systems are reduced when each of the several diversity channels conveying a given signal have decorrelated fading characteristics. Accordingly, a plurality of diversity receivers are used and one or more of the diversity receiver channel signals having the greatest signal strengths are selected as most probably carrying a reliably detectable message signal. In another diversity approach, a composite signal is generated from a combination of all of the received diversity channel signals. In the latter case the diversity channel signals may be appropriately weighted before they are combined. A suitable signal processing technique which has heretofore been utilized in providing appropriate signal weights has been based on a mean-square error criterion, particularly with the transmission of digital data, the weighting factors being utilized to equalize the multipath distortion in each diversity channel to substantially remove any intersymbol interference and to provide proper diversity combining.

DISCUSSION OF THE PRIOR ART

Diversity channel receiver systems using such approach have been described in the prior art. One such system, for example, has been described in U.S. Pat. No. 3,879,664, issued on Apr. 22, 1975 to Peter Monsen. As disclosed therein, a high speed digital communications receiver is used in a diversity receiver system in which a predetection combiner of the receiver utilizes a forward adaptive transversal filter equalizer, having a plurality of weighting sections, in each of the diversity channels for processing each of the received bandpass diversity signals prior to demodulation. The combined weighted output from the predetection combiner is then demodulated and the data therein appropriately reconstructed and an error signal generated. The error signal is modulated and limited for use in adaptive control circuitry which provides appropriate adaptive weighting signals for use in the processing of the received diversity signals at each of the forward filter equalizers. The unmodulated error signal is used in a backward adaptation control circuit for providing appropriate adaptive weighting signals for use in a single backward filter equalizer which suitably processes the reconstructed data to form a cancellation signal which is used to eliminate intersymbol interference and source correlation effects in the demodulated combined weighted output signal. A suitable timing system permits the receiver clock to follow transmitter clock variations and a novel automatic gain control system at the input IF receiver amplifiers is used to reduce the dynamic range requirements of the forward filter weight components.

Such a system provides an effective implementation of an adaptive forward transversal filter equalization system useful with or without a backward filter equalizer and which provides advantages over the systems used or suggested prior thereto, as discussed in the Monsen patent. However, in many applications it may be desirable to further improve the structure and operation thereof so as to reduce the costs thereof and to improve the ease with which such a system can be manufactured.

A disadvantage of the system described in the above-referenced Monsen patent is that the tapped delay lines required in each diversity channel must operate at intermediate frequencies (IF) so that they are normally implemented by utilizing surface wave tapped delay line devices. Such devices are relatively high loss devices at the intermediate frequencies of the radio equipment and, since they are not readily available commercially, they must often be specially made for the application in which they are to be used. For such reason and further because a number of such tapped delay line devices are required, one for each diversity channel, the overall cost thereof becomes relatively high.

Moreover, in the system shown in the above-referenced Monsen patent a relatively large number of large gain-bandwidth product RF amplifiers are required, pairs of such amplifiers, for example, each having a gain of about 30dB, normally being utilized at each delay line tap in each channel. A similar pair thereof is also needed prior to demodulation of the combined signals. Such requirements further increase the costs of manufacture and maintenance of the system and tend to reduce the reliability of the operation thereof in the field.

SUMMARY OF THE INVENTION

In order to overcome the above disadvantages, the system of the invention is arranged to perform the required time delay operation at baseband frequency, rather than at IF frequency, while the complex multiplication and correlations needed for weighting purposes can still be performed at IF frequencies utilizing simple PIN diode multipliers. Such an arrangement in accordance with the invention reduces the total number of tapped delay lines which are required. Further, the delay line operation performed at baseband signal frequency results in much less loss than that incurred at IF frequencies. Accordingly, the number of large gain-bandwidth RF amplifiers required for the overall system operation is considerably reduced over that previously required in the specific implementations of the system described in the above-referred-to Monsen patent.

DESCRIPTION OF THE INVENTION

The system of the invention can be described in more detail with the assistance of the accompanying drawings wherein FIG. 1 shows a broad block diagram of a high speed digital communications receiver utilizing a forward filter equalizer and diversity combiner;

Figure 1:
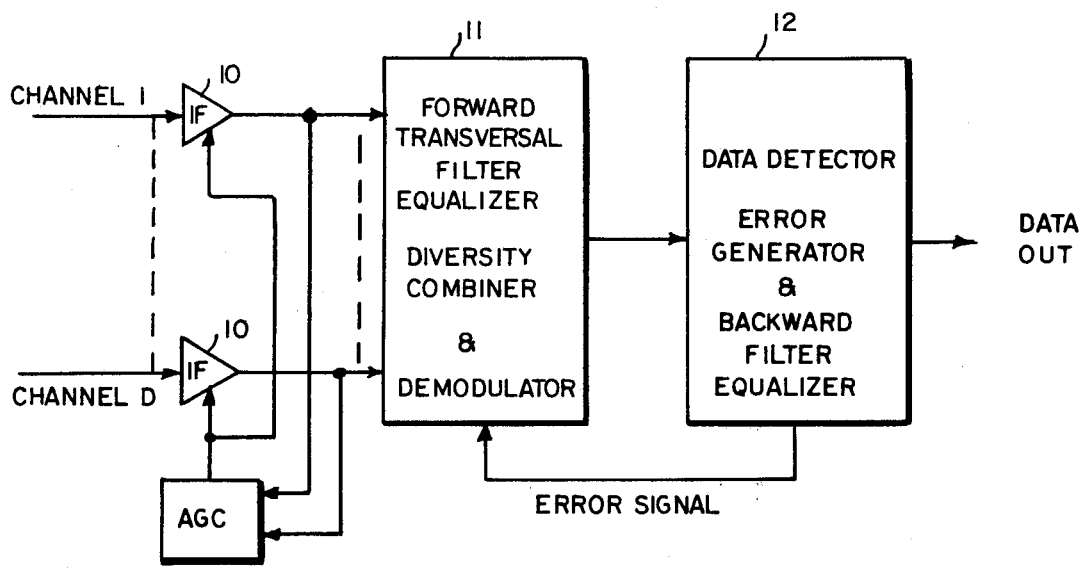

An overall system utilizing a forward transversal and filter equalizer is shown in broad block diagram form in FIG. 1. The system shown therein, for example, could be specifically implemented in accordance with a system of the type described in the aforesaid U.S. Pat. No. 3,897,664 issued to Peter Monsen. Thus, a plurality of diversity channels, identified as "Channel 1" through "Channel D" supply a plurality of input signals to intermediate frequency (IF) amplifiers 10 at each channel. As discussed in the aforesaid Monsen patent, a suitable automatic gain control (AGC) system essentially fixes all the IF amplifier gains according to the strongest of the receiver signals. The signals from IF amplifiers 10 are supplied to a forward transversal filter equalizer, diversity combiner and demodulator 11. The output thereof, at baseband frequency, is then supplied to a data detector, error generator and backward transversal filter equalizer 12 for producing an output data signal. The error generator provides an error signal which is appropriately modulated and fed back to the forward filter equalizer for use in generating the desired weighting signals for use therein. An unmodulated error signal can be used for providing appropriate weighting signals for use in the backward filter equalizer.

Figure 2:
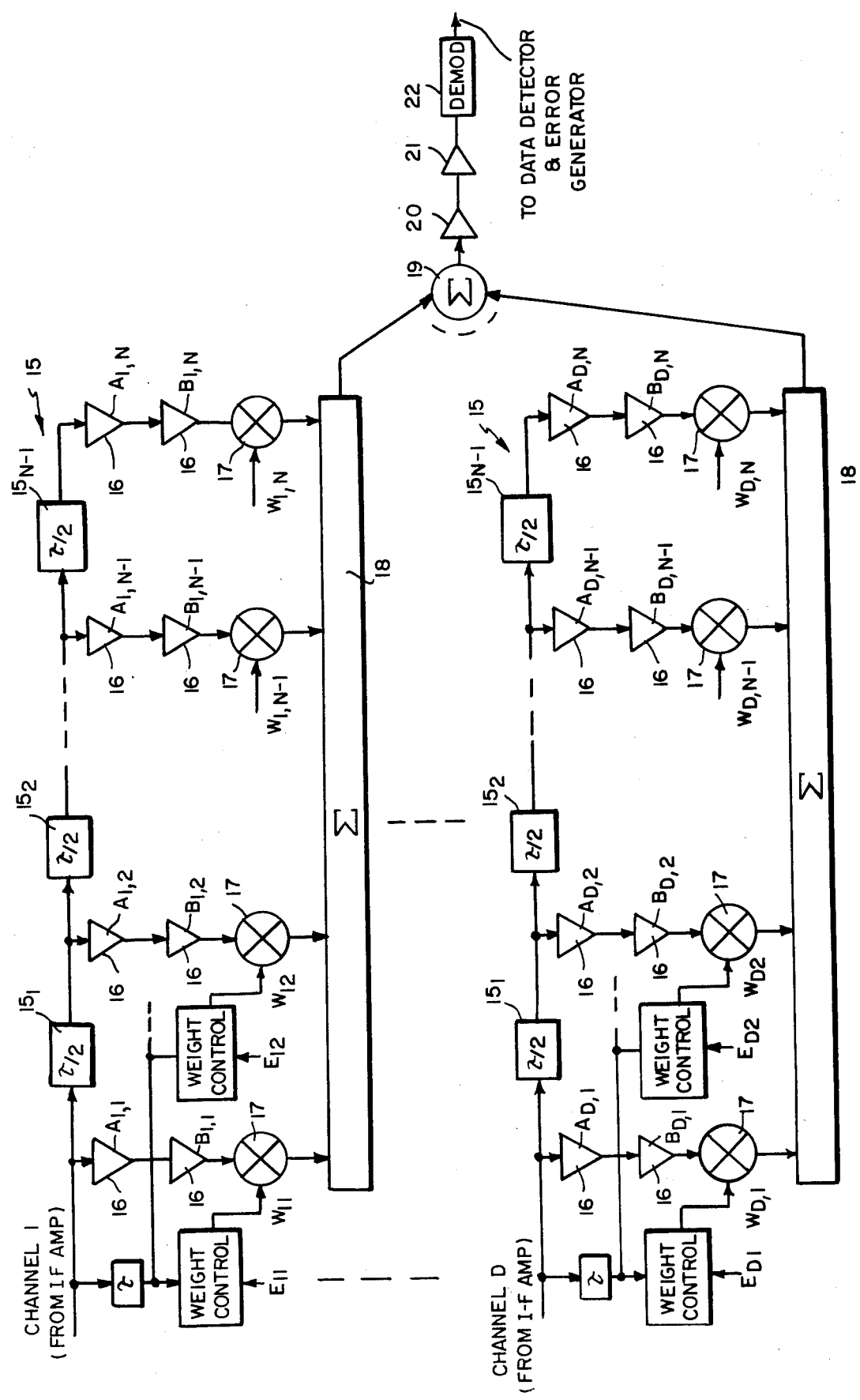
FIG. 2 shows a more specific block diagram of a portion of a forward filter equalizer and diversity combiner of the prior art which is useful in the system of FIG. 1.

While a specific implementation of the portions 11 and 12 of the system shown in FIG. 1 is described in detail in the above-mentioned Monsen patent, the forward filter equalizer and diversity combiner portion of such system is effectively reproduced in simplified block diagram form in FIG. 2 here, two channels of which are representatively depicted.

As can be seen therein, the input signal from the IF amplifier of each channel is supplied to a tapped delay line 15 shown as having time delays $15_1$ through $15_N$ each identified as equal in a preferred embodiment to a time delay of $\tau/2$, where $\tau/2$ is one-half the data symbol interval as discussed in the Monsen patent. The signals at each tap are appropriately amplified by amplifiers 16 which may, in an appropriate system, be relatively large gain-bandwidth RF amplifiers having gains of approximately 30dB and bandwidths much larger than the signal in order to insure phase stability with temperature. The amplifiers are identified by the representations $A_{ij}$ and $B_{ij}$ respectively, where "i" designates the channel and "j" designates the delay line tap. Such amplifiers are required because of the relatively high losses incurred in the time delay device at the intermediate frequency involved. For example, such tapped delay lines may be in the form of tapped surface wave delay line devices which, at such frequencies, are known to produce relatively high losses along the delay line. Accordingly, the gains of amplifiers 16 are suitably arranged to provide a sufficient signal level at complex multipliers 17.

The tapped signals are appropriately weighted by weighting signals (identified as $W_{ij}$). Such weights are suitably controlled as described in the patent via weight control circuitry responsive to the error signal fed back from the error generator circuitry and to the time delayed received input signal which provides for suitable time alignment of the error signal and the received signal. The weighted signals at the outputs of multipliers 17 are appropriately combined at summing devices 18, the outputs of all of the channels being suitably combined at combiner 19. The latter combined signal is amplified by a pair of large gain-bandwidth RF amplifiers 20 and 21, the amplified signal thereupon being demodulated by demodulator 22 to supply the required signal at baseband frequency to the data detector and error generator of the system as shown in FIG. 1. The data detector, error generator and backward filter equalizer are all disclosed in detail in the aforesaid Monsen patent.

As seen in FIG. 2, a separate tapped delay line is required for each of the input channels and, because of the high losses incurred therein, sufficient signal amplification is required at each of the taps prior to the weighting of the tapped signals. Further, appropriate amplification is required prior to demodulation which converts the signal from IF to baseband frequency. For a four-channel system (D=4) and using a delay line having three taps (N=3), four delay line devices and twenty-six large gain-bandwidth IF amplifiers are required. As discussed in the Monsen patent, the signals present in FIG. 2 are complex in nature, i.e., such signals have real and imaginary components, although for simplicity only a single signal line is depicted in the drawings.

Figure 3:
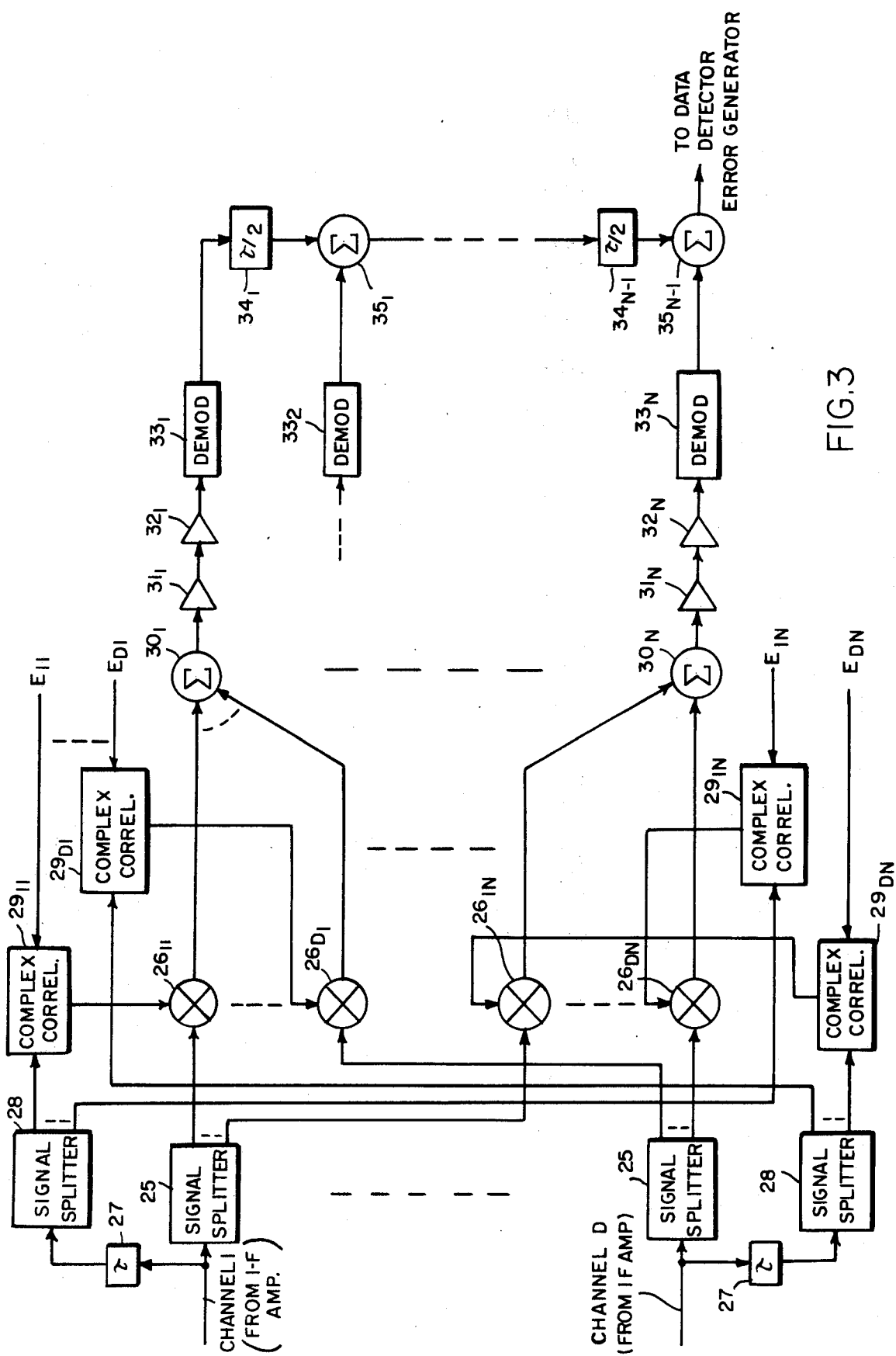
FIG. 3 shows a more specific block diagram of a portion of a forward filter equalizer and diversity combiner in accordance with the invention, which is also useful in the system of FIG. 1.

A significant reduction in complexity and cost compared to the system shown in FIG. 2 can be achieved when using a system in accordance with the invention, a preferred embodiment of which is shown in block diagram form in FIG. 3 for the portion of the overall system of FIG. 1 which corresponds to that depicted in FIG. 2. As seen in FIG. 3, the signal from the IF amplifier of each channel is supplied to a signal splitter 25 which supplies N such signals to each of a plurality of N complex weighting multipliers 26. Thus, the input signal from channel 1 is supplied to N multipliers $26_1$, through $26_{1N}$, the signal from channel 2 to multipliers $26_{21}$ through $26_{2N}$ (not shown), and so on, to the signal from channel D which is supplied to multipliers $26_{D1}$ through $26_{DN}$. The input signal to each channel is also supplied through a time delay device 27 to a further signal splitter 28 which supplies such time delay signal to each of a plurality of N weight control complex correlators 29, in a similar manner. The latter signals are correlated with complex modulated error signals supplied from the error generator as discussed above with reference to FIGS. 1 and 2 to produce weight control signals for supply to the complex weighting multipliers 26 as desired. The generation of such complex error signals is described below with reference to FIG. 4. Time delays 27, as discussed above, are used in order to provide alignment of the received signal with such error signals. In an exemplary embodiment, as shown here and as discussed in the Monsen patent, for example, such latter time delay may correspond to the data symbol interval, $\tau$.

The weighted signals from the complex multipliers 26 are then selectively combined, as shown, at each of a plurality of N combiners $30_1$ through $30_N$. Thus, the signals from multipliers $26_{11}$ through $26_{D1}$ are combined, at combiner 30, the signals from multipliers $26_{12}$ through $26_{D2}$ are combined at combiner $30_2$ (not shown), and so on, to the signals from multipliers $26_{1N}$ through $26_{DN}$ at combiner $30_N$. The outputs of combiners $30_1$ through $30_N$ are each suitably amplified by a pair of large gain-bandwidth product IF amplifiers $31_1$ through $31_N$ and $32_1$ through $32_N$ as shown, the amplified outputs of which are each appropriately demodulated by demodulators $33_1$ through $33_N$, as shown. The output of demodulator $33_1$ is supplied to a first delay element $34_1$ of a plurality of delay elements 34 each having a delay equal to $\tau/2$ as discussed above with respect to the delay lines of FIG. 2. The outputs of the demodulators $33_2$ through $33_N$ are combined with successive outputs of each of the successive delay elements $34_1$ through $34_{N-1}$, as shown at combiners $35_1$ through $35_{N-1}$, the successively combined signals being in each case supplied to the next successive delay element. The final combined signal at combiner $35_{N-1}$ is supplied to the data detector and error generator of the overall system of FIG. 1, at the baseband frequency, as required.

Figure 4:
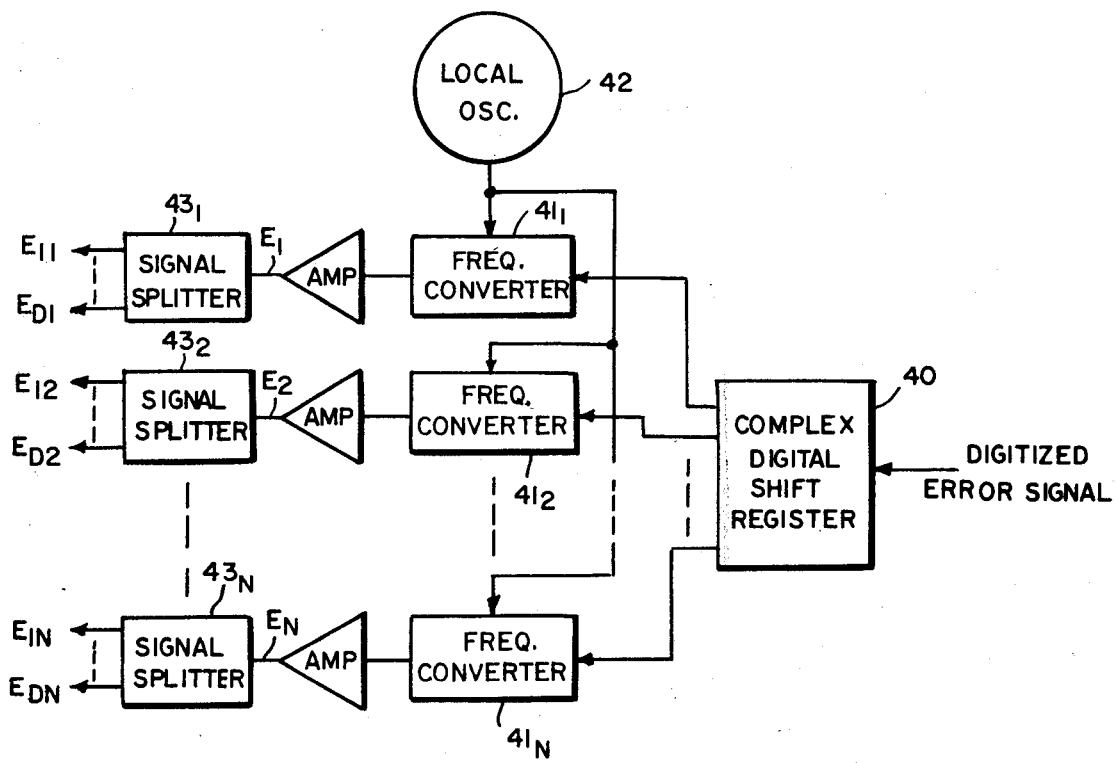
FIG. 4 shows a more specific block diagram of another portion of the forward filter equalizer and diversity combiner in accordance with the invention.

In the system of the invention the specific error signals $E_{ij}$ depicted in FIG. 3 are obtained from the error signal, as shown in FIG. 4, which is fed back from the error generator of FIG. 1. As shown in FIG. 4, the latter error signal, for example, can be suitably digitized, in a manner discussed in the above-referenced Monsen patent, and supplied to a complex digital shift register 40 to supply a plurality of N time-shifted complex error signals which are each then supplied to frequency converters $41_1$ through $41_N$ which shift the frequency upward by the frequency of local oscillator 42. The error signals are amplified and supplied to signal splitters $43_1$ through $43_N$ for correlation with the time delayed received signals at complex correlators 29, as depicted in FIG. 3.

Since the data detection and error generation (and the backward filter equalization operation, if used) in the overall system of the invention shown in FIG. 1 can be implemented in substantially the same manner as already disclosed in the above-referenced Monsen patent, such operations and the structures utilized therefor need not be described in more detail here. Similarly, the timing system disclosed in the aforesaid patent can be utilized here or, alternatively, a timing system such as that disclosed in Megabit Digital Troposcatter Subsystem (MDTS), Preliminary Design and Visualization Plan, Apr. 19, 1974, U.S. Army Contract No. DAAB07-74-C-0040 could also be used. Accordingly, the timing system need not be described in more detail here.

In the invention as disclosed with reference to FIG. 3 the error signals, weighting signals and combined weighted signals, as well as the demodulated signals and the signals at the outputs of each of the taps of the baseband delay line device, are all complex signals, i.e., such signals each have a real and an imaginary part in the same manner as discussed with respect to the signals in the above-referenced Monsen patent. For clarity, the complex signals are not specifically shown as such in the figures, although it is clear to those in the art that both the real and imaginary parts thereof must be operated upon in substantially the manner as shown in the operation of the system described in the aforesaid Monsen patent.

As can be seen in FIG. 3, the delay elements thereof effectively correspond to a single delay line at baseband frequency, as opposed to the plurality of complex tapped delay lines (the number thereof being equal to the number of diversity channels D) required in the previous system shown in FIG. 2. Moreover, while the number of demodulators in FIG. 3 is increased over that needed in the previous system and becomes equal to the number of tapped delay elements, their implementation is considerably easier and less expensive than the implementation of the multiple IF delay lines required in FIG. 2. Moreover, in addition to such advantages, the number of large gain-bandwidth amplifiers required to be implemented in the system of FIG. 3 is reduced to the need for amplifiers 31 and 32 for each of the combined signals. Thus, in a system having "D" diversity channels and having delay lines utilizing "N" taps, the number of large gain-bandwidth IF amplifiers in the system of FIG. 3 is equal to 2N, while in the system of FIG. 3 the number of such amplifiers is equal to 2DN+2. For example, for a system having four diversity channels (D=4) and three taps (N=3), the system of FIG. 3 requires six amplifiers while the system of FIG. 2 requires twenty-six such amplifiers. The use of fewer large gain-bandwidth amplifiers provides a significant advantage in reduced costs and complexity and increased reliability.

While the particular embodiment of the invention described above may be preferred in many applications, modifications thereto will occur to those in the art within the spirit and scope of the invention. For example, in some applications the specific time delays of each of the delay elements $34_1$ through $34_{N-1}$ need not necessarily be selected as equal to $\tau/2$ and, further, the time delays thereof need not necessarily be uniform but may differ from each other. Hence, the invention is not to be construed as limited to the specific embodiment disclosed above except defined by the appended claims.

What is claimed is:

1. A receiver for processing signals transmitted through a dispersive medium from a transmitter and received in a plurality of diversity channels, said receiver comprising
   forward transversal filter equalizer and combining means responsive to said received signals in each of said channels for processing said received signals to produce a combined demodulated weighted output signal, said forward transversal filter equalizer and combining means including
   weighting means associate with each said diversity channel and responsive to the received signal at said channel and to an error signal for producing a plurality of weighted signals at each said channel;
   means for selectively combining said plurality of weighted signals to produce a plurality of combined weighted signals;
   means for demodulating each of said plurality of combined weighted signals to produce a plurality of demodulated weighted signals; and
   time delay and combining means responsive to said demodulated weighted signals for combining said demodulated weighted signals at selected time spaced intervals to produce said combined demodulated weighted output signal; and
   means responsive to said combined demodulated weighted output signal to produce said error signal.

2. A receiver in accordance with claim 1 and further including
   means responsive to said derived error signal for producing a plurality of groups of error signals; and further wherein said weighting means associated with each said channel includes means responsive to the received signal at said channel for providing a first plurality of undelayed received signals and a second plurality of received signals time delayed by a second selected time interval;

a plurality of weight control means responsive to said plurality of time delayed received signals and to a selected group of said plurality of groups of error signals for producing a plurality of weight control signals; and means responsive to said plurality of undelayed received signals and to said plurality of weight control signals for producing said plurality of weighted signals.

3. A receiver in accordance with claim 2 where said means for producing said plurality of groups of error signals includes means responsive to said derived error signal for providing a first plurality of error signals time delayed by time intervals substantially equal to said first selected time intervals; and means responsive to said first plurality of error signals for providing said plurality of groups of said error signals.

4. A receiver in accordance with claims 1, 2 or 3 and further including amplifying means responsive to each of said plurality of combined weighted signals for supplying amplified combined weighted signals to said demodulating means.

5. A receiver in accordance with claim 4 wherein each said amplifying means comprises a pair of amplifiers.

6. A receiver in accordance with claim 4 wherein the amplifiers of each said amplifying means each have gain-bandwidth products sufficiently large to insure phase stability thereof with temperature.

7. A receiver in accordance with claim 1 wherein the number of diversity channels is D and the number of said combined weighted signals is N, said time delay and combining means effectively corresponding to a single tapped delay line device and the number of said demodulating means being equal to N.

8. A receiver in accordance with claim 6 wherein the number of diversity channels is D and the number of said combined weighted signals is N, the number of said amplifiers being equal to 2N.

9. A receiver in accordance with claim 1 wherein said plurality of weighted signals are combined to produce a plurality of weighted signals at intermediate frequencies; and said demodulating means produces a plurality of weighted signals which are time-delayed and combined by said time delay and combining means to produce said combined demodulated weighted output signal at baseband frequencies.

* * * * *